United States Patent [19]

Flautt et al.

[11] 4,016,325

[45] Apr. 5, 1977

[54] GLASS FIBER REINFORCED ELASTOMERS

[75] Inventors: Martin C. Flautt, Granville; Kevin M. Foley, Hebron; Richard M. Haines, Warsaw, all of Ohio

[73] Assignee: Owens-Corning Fiberglas Corporation, Toledo, Ohio

[22] Filed: Apr. 4, 1975

[21] Appl. No.: 565,185

[52] U.S. Cl. .............................. 428/268; 57/140 G; 152/330 R; 260/29.3; 260/844; 427/385 A; 427/390 A; 428/288; 428/269; 428/290; 428/378; 428/392; 428/436; 428/441

[51] Int. Cl.² ......................................... B32B 17/02

[58] Field of Search ........................428/288, 251, 268, 428/273, 285, 286, 289, 290, 378, 392, 394 441, 288, 436; 260/29.3, 844; 57/140 G; 152/330 R; 427/385 A, 390 A

[56] References Cited

UNITED STATES PATENTS

| | | | |
|---|---|---|---|
| 2,184,320 | 12/1939 | Simpson | 427/309 |
| 2,688,007 | 8/1954 | Sternman | 428/391 |
| 2,796,362 | 6/1957 | Wooding | 428/436 |
| 2,943,011 | 6/1960 | Rayner | 156/308 |
| 3,296,174 | 1/1967 | Pickard | 428/441 |
| 3,676,287 | 7/1972 | Flautt | 428/391 |
| 3,719,520 | 3/1973 | Fujimoto | 428/246 |
| 3,769,064 | 10/1973 | Greenlee | 427/309 |
| 3,802,909 | 4/1974 | Rochett | 106/38 |
| 3,914,192 | 10/1975 | Flautt | 428/378 |

*Primary Examiner*—James J. Bell
*Attorney, Agent, or Firm*—John W. Overman; Philip R. Cloutier; Keith V. Rockey

[57] ABSTRACT

Bundles of glass fibers for use as reinforcement for elastomeric materials in which individual glass fibers are sized with a composition consisting essentially of an aqueous emulsion of a polyolefin, and the resulting coated glass fibers are formed into bundles which are impregnated with a blend of a resorcinol-aldehyde resin and an elastomer without subjecting the coated glass fibers to temperatures above 120° F prior to impregnation.

23 Claims, No Drawings

GLASS FIBER REINFORCED ELASTOMERS

This invention relates to glass fiber reinforced elastomeric products, and more particularly to the treatment of glass fibers to provide a secure bonding relationship between glass fibers and elastomeric materials in the manufacture of glass fiber reinforced elastomeric products.

The term "glass fibers", as used herein, is intended to refer to and include (1) continuous fibers formed by the rapid attenuation of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air or other attenuating force directed angularly downwardly onto multiple streams of molten glass issuing from a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and particularly copolymers of butadiene with these and terpolymers thereof with styrene and synthetic rubbers as represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, as alpha-monoolefin having from 3-20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2-12 carbon atoms, and polysulfone rubbers.

Glass fibers have been used as reinforcement for elastomeric materials for quite some time. There were initially numerous difficulties to be overcome in the use of glass fibers as reinforcement for elastomeric materials due to the lack of compatibility between glass fibers and elastomeric materials. One of the primary difficulties in securely integrating glass fibers with the elastomeric materials in the manufacture of glass fiber reinforced elastomeric products is the establishment of a secure bonding relationship between the glass fibers and the elastomeric materials with which they are combined.

As is well known to those skilled in the art, glass fibers are completely smooth, rod-like members, and thus it is difficult to establish any sort of a physical bond between the glass fibers and the elastomeric material. This difficulty is further compounded by the fact that glass fibers have highly hydrophilic surface characteristics whereby the glass fibers develop, as they are formed, a tenacious film of water on the surfaces which serves to destroy any bond, chemical or physical, which might otherwise be established between glass fibers and elastomeric materials.

Many of these difficulties in securely integrating glass fibers with elastomeric materials have been overcome by the use of organo silicon compounds as coupling agents. These coupling agents are generally applied to glass fibers as they are formed, and tend to render the glass fiber surfaces hydrophobic, and thus able to establish a chemical bond between the glass fiber surfaces and the elastomeric materials with which the glass fibers are combined in the manufacture of glass fiber reinforced elastomeric products.

Organo silicon compounds which have received the most wide-spread acceptance as coupling agents for use in the treatment of glass fibers are those organo silanes which contain a functional group as a part of the organic group bonded directly to the silicon atom. Such silanes may be represented by the general formula

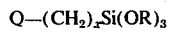

$$Q-(CH_2)_x-Si(OR)_3$$

wherein $x$ is an integer from 3 to 7, R is a lower alkyl group and Q is a functional group, such as an amino group, a mercapto group, a glycidoxy group, etc. One of the most frequently preferred coupling agents is gamma-aminopropyltriethoxy silane.

It has become the practice to formulate such organo silicon coupling agents in aqueous size compositions formulated to include not only the organo silicon compound, usually in the form of the silane as described above, but also a film-forming material such as a synthetic resin, wetting agents, emulsifying agents, glass fiber lubricants, etc. Such components of size compositions are described in detail in U.S. Pat. No. 3,676,287 and U.S. Pat. No. 3,837,898. As is described in those patents, it has been the practice to treat the glass fibers, preferably as they are formed, with the size composition to form a thin film coating thereon, and then form the glass fibers into strands, cords, yarns or fabrics, generally referred to in the art as bundles, and subject the bundles to impregnation with an impregnant formulated to contain a blend of a resorcinol-aldehyde resin and at least one elastomer.

While the practice as outlined above has resulted in significant improvements in forming a secure bonding relationship between glass fibers and elastomeric materials in the manufacture of glass fiber reinforced elastomeric products, the use of organo silicon compounds as coupling agents represents a disadvantage from the standpoint of cost. The functional organo silanes described above are quite expensive, and thus contribute significantly to the costs involved in the manufacture of glass fiber reinforced elastomeric products.

It is accordingly an object of the present invention to provide a composition for use in the treatment of glass fibers to improve the processing and performance characteristics of glass fibers in the manufacture of glass fiber reinforced elastomeric products which provide comparable adhesion between glass fibers and elastomeric materials with which the glass fibers are combined, and yet can be formulated without an organo silicon compound as a coupling agent.

It is another object of the invention to produce and to provide a method for producing glass fibers for use in the manufacture of glass fiber reinforced elastomeric products in which the glass fibers are initially coated with a size composition formulated without an organo silicon compound as a coupling agent.

The concepts of the present invention reside in glass fibers which have been coated, as they are formed, with a size composition formulated of an aqueous emulsion of a polyolefin. It has been found that a size composition formulated of the polyolefin as the essential component can be used in the treatment of glass fibers without the inclusion of an organo silane to provide glass fibers which, when subjected to impregnation with an impregnant containing a blend of a resorcinol-aldehyde resin and an elastomer, provide excellent adhesion characteristics with elastomeric materials in the manufacture of glass fiber reinforced elastomeric products.

In the practice of this invention, a size composition is formulated of an aqueous emulsion of a polyolefin, such as polyethylene, polypropylene and copolymers of ethylene and propylene. One such emulsion which has been found to be highly suitable for use in the practice of this invention is the polyethylene emulsion marketed by Quaker Chemical Company as "Quasoft HS-60". Glass fibers which have been coated with the polyolefin emulsion are then formed into bundles without drying at temperatures above 120° F, and the resulting bundles are subjected to impregnation with a blend of a resorcinolaldehyde resin and an elastomer to form an impregnated bundle for use as reinforcement as elastomeric materials.

It is an important concept of the present invention that the glass fibers which have been coated as they are formed with the polyolefin emulsion not be treated as by drying, at a temperature above 120° F. It has been found that glass fibers which have been coated as they are formed with the polyolefin emulsion can be subjected to impregnation, either while still wet with the polyolefin emulsion or after drying at ambient temperatures (i.e., at temperatures within the range of 50° to 100° F) to form impregnated bundles having tensile strength and adhesion characteristics comparable to bundles of glass fibers treated in the same manner, except that the size composition was formulated to contain an organo silane coupling agent.

The theory underlying the effectiveness of the use of polyolefin emulsion with subsequent treatment at low temperatures is not fully understood at the present time. However, without limiting the present invention as to theory, it has been hypothesized that the elevated temperature drying or like treatment of sized fibers containing, for example, a polyolefin film coating in combination with an organo silicon compound as a coupling agent is subjected to a thermal degradation of the organo silicon compound and/or the polyolefin which deleteriously affects both the tensile and adhesion characteristics of the compound.

The glass fibers which have been coated with the polyolefin emulsion and then subjected to impregnation with the blend of the resorcinol-aldehyde resin and the elastomer can then be used as reinforcement for elastomeric materials. A number of impregnating compositions can be used in the treatment of bundles of glass fibers which previously have been sized with the polyolefin emulsion in accordance with the practice of this invention. In general, such compositions are formulated to include 2 to 10 parts by weight of a resorcinol-aldehyde resin and 20 to 60 parts by weight of at least one elastomer. Such impregnating compositions are well known to those skilled in the art and are described in U.S. Pat. Nos. 3,402,064, 3,424,608, 3,567,671, 3,591,357 and 3,787,224.

In the preferred practice of this invention, the impregnating composition employed is formulated of a resorcinolaldehyde resin, a butadiene-styrene-vinyl pyridine terpolymer, a microcrystalline paraffin wax and either a copolymer of vinyl chloride and vinylidene chloride or a carboxylated butadiene-styrene copolymer, preferably a dicarboxylated butadiene-styrene copolymer. Impregnating compositions of this type are described in U.S. Pat. Nos. 3,561,671 and 3,787,224.

Impregnation is preferably carried out by immersing the bundle of glass fibers containing the thin size coating from the polyolefin emulsion in a bundle of the impregnant, and subjecting the impregnant to a sharp bend while immersed in the composition to thereby open the bundle to facilitate complete penetration of the solids of the impregnating composition into the bundle to thereby fill the interstices between the glass fibers forming the bundle and defining a unitary bundle structure. Methods for impregnation are well known to those skilled in the art; one such method preferred for use in the practice of this invention is described in detail in U.S. Pat. No. 3,424,608.

Having described the basic concepts of the invention, reference is now made to the following examples which are provided by way of illustration, and not of limitation, of the practice of this invention in the treatment of glass fibers as they are formed with the polyolefin emulsion, followed by impregnation with an elastomeric compatible material.

EXAMPLE 1

A size composition is formulated in accordance with the present invention as follows.

| Size Composition | Parts by Weight |
|---|---|
| Polyethylene emulsion (Quasoft HS-60) | 480 |
| Isopropanol | 60 |
| Water | 3460 |

The foregoing size composition is applied to glass fibers as they are formed. Three different samples of the glass fibers containing the thin film size coating of the polyethylene emulsion thereon are subjected to impregnation with the following impregnating composition described in U.S. Pat. No. 3,567,671.

| | Parts by Weight |
|---|---|
| Part A: | |
| Distilled water | 732 |
| Sodium hydroxide | 1 |
| Resorcinol formaldehyde polymer in the form of a resin containing 75% solids (Penacolyte R-2170) | 48 |

-continued

|  | Parts by Weight |
|---|---|
| Formalin (37% formaldehyde) | 16 |
| Part B: | |
| Butadiene - styrene - vinyl pyridine terpolymer (42% solids) | 900 |
| Ammonium hydroxide | 80 |
| Part C: | |
| Water | 200 |
| Ammonium hydroxide | 15 |
| Vinyl chloride-vinylidene chloride copolymer (50% by weight solids—Dow Latex 874) | 350 |
| Microcrystalline paraffin wax (melting point 145–150° F.) —Vultex Wax Emulsion No. 5 of General Latex and Chemical Corp. (56% solids) | 200 |

Cord I is subjected to impregnation while the glass fibers are still wet with the polyethylene emulsion; cord II is impregnated after the glass fibers containing the polyethylene size coating thereon have been subjected to air drying at ambient temperature (70° F); and, cord III is impregnated by first drying the sized glass fibers in an oven maintained at a temperature of 175° F, followed by impregnation.

Each of the cords is then tested to determine the tensile strength of the cord and the adhesion characteristics of the cord with respect to rubber by molding the cord between two strips of rubber. The results of these tests are as follows.

|  | Tensil strength (Lbs) | Adhesion (Lbs) |
|---|---|---|
| Impregnation with wet, sized fibers | 60 | 47 |
| Impregnation with air-dried glass fibers | 61 | 37 |
| Impregnation with oven-dried glass fibers | 56 | 19 |

As is shown by the foregoing test data, the tensile strength of the cords formed by impregnation of the glass fibers which are still wet with the size composition and the tensile strength of the cord formed from glass fibers which have been air dried prior to impregnation are substantially the same, and are higher than the tensile strength for the cord formed from sized glass fibers which have been oven dried. The data also reveals that the adhesion characteristics of the cords are markedly different, with the cord formed from the oven dried, sized glass fibers being drastically lower than the adhesion for the cords formed from the glass fibers subjected to impregnation while still wet with the size composition and the cords subjected to impregnation after being air dried.

EXAMPLE 2

Glass fibers are sized as they are formed using the size composition illustrated in Example 1. For this purpose, use is made of sufficient quantities of the size composition to deposit a coating constituting from 0.05 to 10% by weight based upon the weight of the glass fibers.

The sized glass fibers are then subjected to impregnation with the following impregnating composition described in detail in U.S. Pat. No. 3,787,224.

| Impregnating Composition | Parts by Weight |
|---|---|
| Part A: | |
| Deionized water | 732 |
| Sodium hydroxide | 1 |
| Resorcinol-formaldehyde polymer in the form of a latex containing 75% solids (Penacolite R2170) | 48 |
| Formalin (37% formaldehyde) | 16 |
| Part B: | |
| Butadiene-styrene-vinyl pyridine terpolymer (42% solids) (Gentac PS) | 900 |
| Ammonium hydroxide | 80 |
| Part C: | |
| Water | 200 |
| Ammonium hydroxide | 15 |
| Dicarboxylated butadiene-styrene resin (50% solids) (Pliolite 4121) | 350 |
| Micro-crystalline paraffin wax (melting point 145°–150° F.)-Vultex Wax Emulsion No. 9 of General Latex and Chemical Corp. 56% solids) | 100 |

The impregnating composition is employed in an amount sufficient to impregnate with dry solids 5 to 50% by weight of the glass fiber bundle, and preferably 10 to 25% by weight.

The impregnated bundle of glass fibers is found to have good tensile strength and adhesion characteristics.

The elastomeric material with which the impregnated bundles of glass fibers are combined constitutes a continuous phase. The elastomer constituting that continuous phase may be selected from elastomers of the type incorporated into the impregnating composition, or the elastomeric material may differ therefrom. The continuous phase elastomer can be employed in a cured or uncured state or in a vulcanized or unvulcanized state. It is believed that the tie-in between the bundles of glass fibers and the elastomer constituting the continuous phase occurs primarily during curing or vulcanization of the elastomeric material or materials in combination with the impregnated bundles.

In fabricating combinations of bundles of glass fibers prepared in accordance with the concepts of the present invention with elastomeric materials, the bundles of glass fibers are mixed with the elastomeric material or otherwise laid down in the desired arrangement for combination with the elastomeric material, as in the manufacture of glass fiber reinforced belts or in the manufacture of rubber tires reinforced with cords of glass fibers. The combinations of glass fibers and elastomeric materials are then processed in a conventional manner by molding and curing under heat and pressure or by vulcanizing for advancement of the elastomeric material to a cured or vulcanized state while in combination with the bundles of glass fibers whereby the bundles become securely integrated with the elastomeric material.

The practice of the present invention is particularly well suited for use in the treatment of glass fibers as reinforcement for elastomeric products such as tires, and particularly vehicular tires of the pneumatic type. The glass fiber bundles of the present invention, in accordance with this concept, are preferably formed into cords by plying and twisting together strands of glass fibers. The bundles are treated, preferably before twisting, with the impregnating composition in the practice of this invention, and then twisted to form the tire cord. That tire cord can then be formed into woven or non-woven fabrics for use in the treatment of pneumatic tires.

It will be understood that various changes and modification can be made in the details of formulation, procedure and use without departing from the spirit of the invention, especially as defined in the following claims.

We claim:

1. A method for the manufacture of bundles of glass fibers for use in the production of glass fiber-reinforced elastomeric product comprising the steps of coating glass fibers with a size composition consisting essentially of an aqueous emulsion of a polyolefin and isopropanol, forming the coated glass fibers into a bundle and impregnating the bundle of glass fibers with an impregnating composition containing a blend of a resorcinol-aldehyde resin and at least one elastomer without subjecting the coated glass fibers to temperatures above 120° F to form an impregnated bundle.

2. A method as defined in claim 1 wherein the bundle is impregnated while the glass fibers are still wet with the size composition.

3. A method as defined in claim 1 wherein the glass fibers are dried at temperatures below 120° F prior to impregnation.

4. A method as defined in claim 1 wherein the polyolefin is selected from the group consisting of polyethylene, polypropylene and copolymers of ethylene and propylene.

5. A method as defined in claim 1 wherein the polyolefin is a polyethylene.

6. A method as defined in claim 1 wherein the glass fibers are dried at a temperature of 50° to 100° F prior to impregnation.

7. A method as defined in claim 1 wherein the bundle is impregnated by immersing the bundle in a bath of the impregnating composition and subjecting the bundle to a sharp bend while immersed therein to facilitate penetration of the impregnant into the bundle.

8. A method as defined in claim 1 wherein the impregnating composition contains a blend of a resorcinol-aldehyde resin, a butadiene-styrene-vinyl pyridine terpolymer, a microcrystalline paraffin wax and a polymer selected from the group consisting of a vinyl chloride-vinylidene chloride copolymer and a carboxylated butadiene-styrene copolymer.

9. A method as defined in claim 8 wherein the polymer is a dicarboxylated butadiene-styrene copolymer.

10. A method as defined in claim 1 wherein the glass fibers are coated as they are formed.

11. A glass fiber bundle comprising a plurality of glass fibers, each of the glass fibers having a coating on the surfaces thereof, said coating consisting essentially of a polyolefin and isopropanol and an impregnant in the bundle, said impregnant containing a blend of a resorcinol-aldehyde resin and at least one elastomer.

12. A bundle as defined in claim 11 wherein the fibers having the coating thereon have been maintained at a temperature below 120° F prior to impregnation.

13. A bundle as defined in claim 11 wherein the polyolefin is selected from the group consisting of polyethylene, polypropylene and copolymers of ethylene and propylene.

14. A bundle as defined in claim 11 wherein the polyolefin is a polyethylene.

15. A bundle as defined in claim 11 wherein the impregnant contains a blend of a resorcinol-aldehyde resin, a butadiene-styrene-vinyl pyridine terpolymer, a microcrystalline paraffin wax and a polymer selected from the group consisting of a vinyl chloride-vinylidene chloride copolymer and a carboxylated butadiene-styrene copolymer.

16. A bundle as defined in claim 15 wherein the polymer is a dicarboxylated butadiene-styrene copolymer.

17. A bundle as defined in claim 11 wherein the impregnant completely fills the interstices between the glass fibers forming the bundle.

18. A bundle as defined in claim 11 wherein the bundle is in the form of strands of glass fibers which have been plied and twisted together to form a cord.

19. A bundle as defined in claim 18 wherein the bundle is in the form of cords woven to form a fabric.

20. In a glass fiber reinforced elastomeric product in which an elastomeric material constitutes a continuous phase in which bundles of glass fibers are combined, the improvement in the bonding relationship between the bundles and the elastomeric material comprising glass fiber bundles as defined by claim 11.

21. An elastomeric product as defined in claim 20 wherein the bundles are in the form of strands of glass fibers which have been plied and twisted together.

22. An elastomeric product as defined in claim 21 wherein the bundles are in the form of cords woven to form a fabric.

23. An elastomeric product as defined in claim 21 wherein the elastomeric product is a pneumatic tire reinforced with said bundles.

* * * * *